United States Patent [19]

Ladin et al.

[11] 4,179,780
[45] Dec. 25, 1979

[54] METHOD OF MAKING A CLUTCH THROW-OUT BEARING ASSEMBLY

[75] Inventors: Eli M. Ladin, Ann Arbor; Mark P. Reynolds, Birmingham, both of Mich.

[73] Assignee: Federal-Mogul Corporation, Southfield, Mich.

[21] Appl. No.: 915,698

[22] Filed: Jun. 15, 1978

Related U.S. Application Data

[62] Division of Ser. No. 711,753, Aug. 4, 1976, Pat. No. 4,117,917.

[51] Int. Cl.² ............................................. B21D 53/10
[52] U.S. Cl. ........................... 29/149.5 R; 29/149.5 C; 29/509
[58] Field of Search ........... 29/509, 149.5 C, 149.5 R; 308/237 R, 240; 192/98

[56] References Cited

U.S. PATENT DOCUMENTS

| | | | |
|---|---|---|---|
| 2,283,217 | 5/1942 | McCullough | 308/237 R |
| 2,283,918 | 5/1942 | Dekome | 308/237 R X |
| 2,674,782 | 4/1954 | Surtees | 29/149.5 C |
| 2,762,118 | 9/1956 | Shaw et al. | 29/149.5 R X |
| 3,308,524 | 3/1967 | Budinger et al. | 308/237 R X |
| 3,795,428 | 3/1974 | Paine et al. | 308/237 R X |
| 3,877,557 | 4/1975 | Maucher | 192/98 |
| 3,909,087 | 9/1975 | Cairns | 308/240 X |
| 4,077,504 | 3/1978 | Ernst et al. | 192/98 |
| 4,143,748 | 3/1979 | Maucher | 192/98 |

FOREIGN PATENT DOCUMENTS

| | | | |
|---|---|---|---|
| 726358 | 3/1955 | United Kingdom | 192/98 |
| 1390092 | 4/1975 | United Kingdom | 192/98 |
| 1421030 | 1/1976 | United Kingdom | 192/98 |

*Primary Examiner*—Charlie T. Moon
*Attorney, Agent, or Firm*—Robert F. Hess

[57] ABSTRACT

An improved clutch throw-out bearing assembly and method of making same comprising an antifriction bearing member of either thrust or angular contact variety permanently secured, by staking or the like, to a bearing carrier of formed strip steel, preferably bimetallic, having an integral axially extending portion terminating in a radially outwardly extending flange which with the spaced apart antifriction bearing member form a circumferential groove for receiving the clutch fork or activation member.

4 Claims, 4 Drawing Figures

METHOD OF MAKING A CLUTCH THROW-OUT BEARING ASSEMBLY

This is a division of application Ser. No. 711,753, filed Aug. 4, 1976, now U.S. Pat. No. 4,117,917.

BACKGROUND OF THE INVENTION

Traditionally clutch throw-out bearings have been machined from steel tubes or forgings. It has been common also to machine the bearing inner race member and the carrier bore as one integral member. This involves considerable expense in time, labor, and material. Scrap from the turning operation on the bearing carrier has been a major source of waste. In recent years as metal forming techniques and specialized steels have been improved, some attempts have been made to form the entire clutch release bearing assembly of sheet metal, as shown in U.S. Pat. No. 3,885,658, for example, with the objective being to reduce cost but maintain performance. This may be satisfactory for light duty applications but is inadequate for heavier applications such as the automobile.

The method and improved clutch throw-out bearing of the present invention overcomes many of the problems prevalent in prior art constructions and techniques providing for improved efficiency, simplicity and economy in manufacture and further providing a bearing assembly of durable operation and versatile design.

BRIEF SUMMARY OF THE INVENTION

The clutch throw-out bearing assembly of the present invention includes an antifriction bearing, one race member of which includes a face adapted to contact the clutch release fingers and the other race member is secured to a one piece sheet metal tubular bearing carrier adapted to be guidably mounted on a support shaft. The bearing carrier is provided with a member such as a flange on one end portion for engaging an actuation fork and locating and securing means on the other end portion for positioning and securing the bearings in spaced apart relationship to the flange. The bearing carrier may also be made of bimetal sheet comprising a backing strip having a facing of soft metal bearing alloy on one surface thereof with the softer bearing alloy metal being on the inside surface where it slidingly engages the support shaft. Provisions are also made on the surface of the bearing carrier disposed in contact with the support shaft for inclusion of recesses that act as reservoirs and distribution means for a lubricant.

DESCRIPTION OF THE PREFERRED EMBODIMENT

Figure 1:
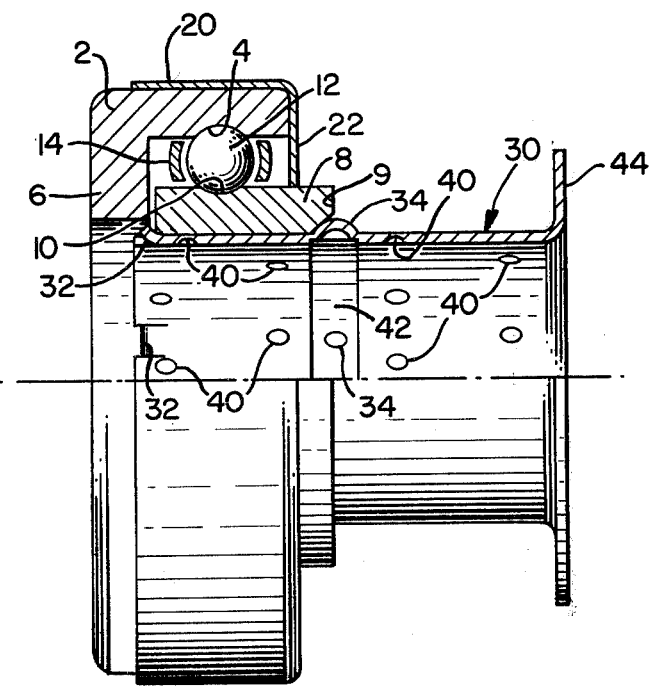
FIG. 1 is a view in elevation and partial cross section showing the assembled relationship between an angular contact bearing, external collar, and internal bearing carrier in accordance with this invention.

The preferred embodiment as shown in FIG. 1 includes three general parts which will be discussed in the following detailed description. These parts are a bearing, an outer collar, and an inner sleeve or bearing carrier. It should be understood, unless specifically stated otherwise, that the term "Bearing" refers to either an angular contact type bearing where the race members are disposed in substantially radially opposed relationship or a thrust bearing where the race members are disposed in substantially axially opposed relationship to constrain a plurality of antifriction elements therebetween.

The bearing comprises a first race member 2 with an internal circumferential ball groove 4 and a radial flange 6 on one end for contacting clutch release fingers which are not shown. A second race member 8 includes an external circumferential ball groove 10. Between the outer ball groove 4 and the inner ball groove 10 are confined a plurality of rolling elements 12 which contact the grooves 4 and 10 but are restrained from direct contact with each other by a cage or separator 14. The internal geometry of the bearing is such that the radial flange 6 of the first race member 2 overlaps and closely approaches but does not touch the second race member 8. The flange 6, therefore, serves not only as a surface to actuate the clutch release fingers (not shown) but also acts as a shield to exclude foreign matter from the interior of the bearing on that side.

The first race member 2 of the bearing is partially enclosed by a generally cylindrical sheet metal collar 20. The collar 20 is retained on the outside diameter of the first race member 2 such as by an interference fit and extends axially along the bearing past the end opposite the external race flange 6 where the collar 20 is formed into a radial flange 22. The flange 22 extends inwardly to a position where its inward annular edge is disposed in spaced clearance relationship to the periphery of the second race member 8. Flange 22, therefore, forms a shield to exclude foreign matter from entering the bearing on the end opposite the first race flange 6.

In normal practice the first race member 2, the second race member 8, the rolling elements 12, the separator 14, and the outer sheet metal collar 20 are assembled as an integral unit. The assembled unit is press fitted onto the carrier 30 and secured in place such as by staking indicated at 32. The axial location of the bearing on the carrier is established by coaction between the edge of the inner race member 8 against the locating protrusions 34.

Figure 2:
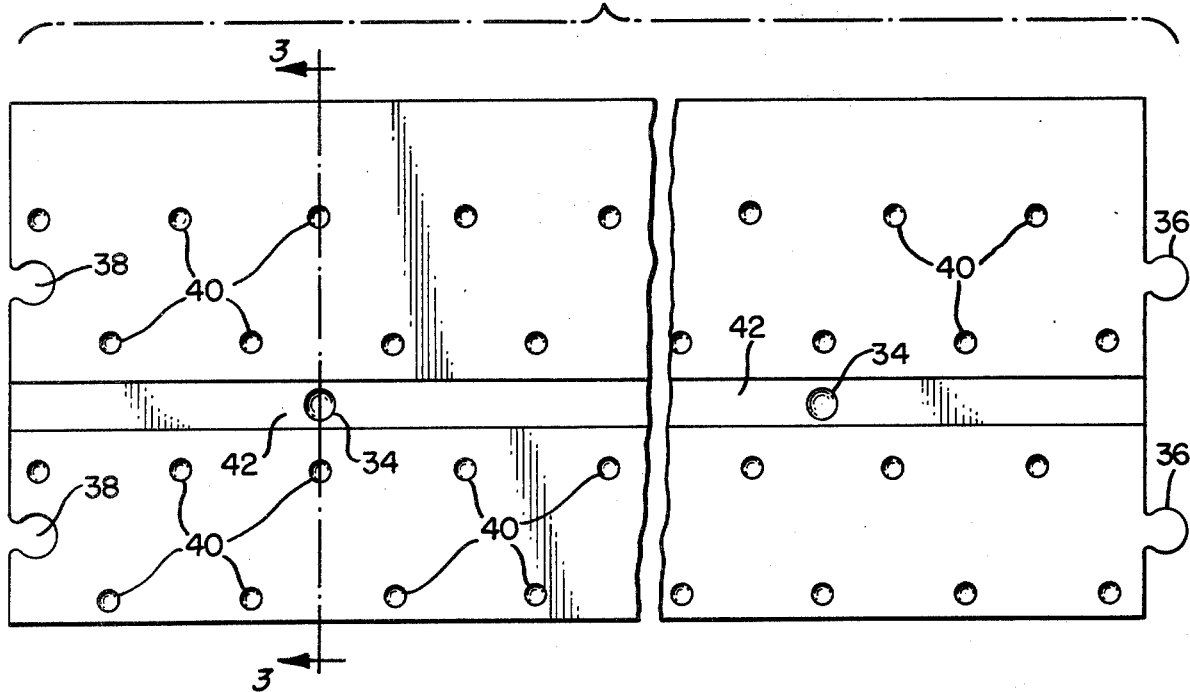
FIG. 2 is a plan view of the carrier as stamped from flat sheet metal stock before the stamping operation forms it into a generally cylindrical configuration.
Figure 3:
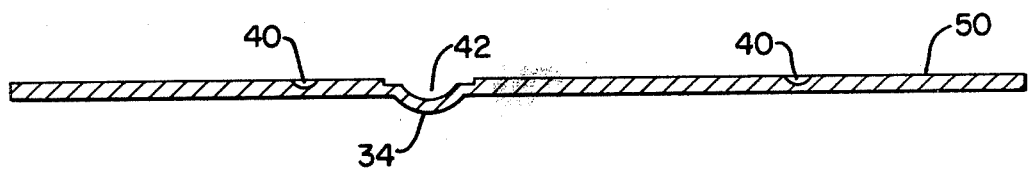
FIG. 3 is an enlarged cross-section of the carrier of FIG. 2 at 3—3 looking in the direction of the arrows.

The bearing carrier 30 is produced from a rectangular sheet metal stamping, as shown in FIG. 2, which is cut to size, with the sheet thickness ranging generally from 0.040 to 0.120 inches and 0.060 being preferred for automotive use. The ends may be straight to form a butt-joint or include male 36 and female 38 clinches to form a clinch-butt joint coacting in interlocking engagement. The stamping process also includes producing the pattern of grease indentations 40, a grease groove 42 and locating protrusions 34. These features may also be seen in cross-section in FIG. 3. A subsequent stamping operation forms the bearing carrier 30 into the final generally cylindrical shape with the actuation flange 44 (FIG. 1) formed from the edge portion 50, devoid of any indentation patterns (FIG. 2 and FIG. 3).

Figure 4:
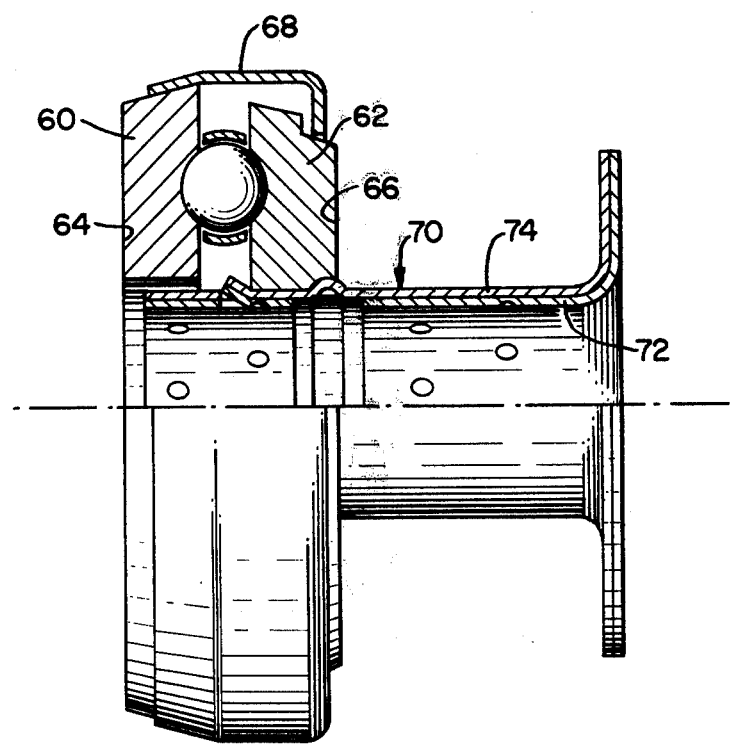
FIG. 4 is a view in elevation and partial cross-section showing the relationship of the components in which the bearing is of the thrust type and the carrier is made from flat bimetal sheet stock.

FIG. 4 shows another version of the preferred embodiment in which the angular contact race members 2 and 8 of FIG. 1 have been replaced with thrust washer race members 60 and 62. Race member 60 is adapted to contact the clutch release fingers (not shown) at surface 64 and race member 62 locates the bearing on the carrier 70 and contacts the actuation fork at surface 66. An outer annular collar 68 not only excludes foreign matter from the contact area of the antifriction elements but also serves to make the race members 60 and 62 inseparable once the assembly has been made. One advantage of this embodiment lies in the fact that these race designs are readily adaptable to manufacture by such methods as forging or powdered metallurgical techniques that include compacting and sintering, which reduce waste of material and machining time. The bearing carrier 70 in FIG. 4 is shown in a form wherein the original sheet metal stock is bimetal comprising a babbitt layer 72 or the like on the inside and a steel backing layer 74 on the outside. The provision of a soft metal bearing alloy layer such as the babbitt layer 72, imparts improved performance of the bearing carrier where it slidably engages the support shaft (not shown).

In accordance with the embodiment shown in FIG. 1, when pressure is applied to the throw-out bearing assembly for disengaging the clutch, the force is applied directly to the exposed face 9 of the second race member 8 which transmits the thrust through the antifriction elements 12 and the radial flange 6 which contacts the clutch release fingers (not shown). Because of this there is no stress applied to the bearing carrier 30 except to slide it along a support member (not shown). Retraction of the bearing assembly by pressure in the opposite direction on the radial flange 44, requires only that the weight of the bearing assembly be slidingly moved along the bearing support member. Similarly, in accordance with the alternative embodiment shown in FIG. 4, pressure is transmitted from the throw-out bearing face 66 of race member 62, through the antifriction elements to race member 60 where face 64 contacts the clutch throw-out fingers. For this reason it is impractical and indeed wasteful to make the bearing carrier 30 shown in FIG. 1 or 70 shown in FIG. 4 of the same heavy load bearing construction as are the first and second race members.

To those skilled in the art to which this invention relates, many changes in construction and widely differing embodiments and applications of the invention will suggest themselves without departing from the spirit and scope of the invention. The disclosures and the description herein are purely illustrative and are not intended in any way to be limiting.

We claim:

1. A method of making a clutch throw-out bearing assembly which includes an antifriction bearing with a bearing carrier inserted telescopically into the bore thereof and securing said bearing carrier to said antifriction bearing by staking or the like, the improvement comprising, stamping said bearing carrier as a single unit from flat sheet metal stock including the steps of providing a flat sheet metal stock, embossing said flat sheet metal stock with a plurality of recesses on one face thereof, die-forming said sheet metal stock to impart at least one protuberance projecting from the other surface thereof, forming said flat sheet metal stock into a generally cylindrical tube with the embossed said one face defining the internal surface of said tube, forming a radial flange on said tube by upsetting one end of said tube, slidably inserting the other end of said tube into the bore of said antifriction bearing in axial abutting contact with said protuberance and thereafter securing said bearing on said tube forming a clutch throw-out bearing assembly.

2. A method of making a clutch throw-out bearing assembly as described in claim 1 wherein said step of forming said flat sheet metal stock into said cylindrical tube includes the further steps of forming coacting means on the opposite edges of said stock, and dieforming said stock into a tubular form wherein opposed abutting edges are disposed in interlockingly engaged relationship.

3. A method of making a clutch throw-out bearing assembly as described in claim 1 wherein said antifriction bearing race members are of the thrust washer type being formed by forging.

4. A method of making a clutch throw-out bearing assembly as described in claim 1 wherein said antifriction bearing race members are of the thrust washer type being formed by powdered metallurgical compacting and sintering techniques.

* * * * *